(12) United States Patent
Nishioka et al.

(10) Patent No.: US 12,299,205 B2
(45) Date of Patent: May 13, 2025

(54) MEASUREMENT DEVICE AND MEASUREMENT METHOD, AND PROGRAM FOR MEASURING A MOVEABLE RANGE OF A FINGER

(71) Applicant: SONY GROUP CORPORATION, Tokyo (JP)

(72) Inventors: Hayato Nishioka, Tokyo (JP); Takanori Oku, Tokyo (JP); Shinichi Furuya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 381 days.

(21) Appl. No.: 17/787,069

(22) PCT Filed: Dec. 14, 2020

(86) PCT No.: PCT/JP2020/046458
§ 371 (c)(1),
(2) Date: Jun. 17, 2022

(87) PCT Pub. No.: WO2021/131828
PCT Pub. Date: Jul. 1, 2021

(65) Prior Publication Data
US 2023/0037640 A1 Feb. 9, 2023

(30) Foreign Application Priority Data

Dec. 27, 2019 (JP) .................................. 2019-237875

(51) Int. Cl.
*G06F 3/01* (2006.01)
*G01B 5/24* (2006.01)
(Continued)

(52) U.S. Cl.
CPC ............... *G06F 3/017* (2013.01); *G01B 5/24* (2013.01); *G06F 3/014* (2013.01); *G09B 15/06* (2013.01); *G09B 15/00* (2013.01)

(58) Field of Classification Search
CPC ........... G01B 5/24; G06F 3/014; G06F 3/017; G09B 15/00; G09B 15/06
See application file for complete search history.

(56) References Cited

U.S. PATENT DOCUMENTS

2019/0059789 A1\* 2/2019 Ban ...................... A61B 5/6831
2019/0250708 A1\* 8/2019 Gupta .................. G02B 27/017

FOREIGN PATENT DOCUMENTS

JP 2006-343519 A 12/2006
JP 2007-275486 A 10/2007
(Continued)

*Primary Examiner* — Andre J Allen
(74) *Attorney, Agent, or Firm* — Paratus Law Group, PLLC

(57) ABSTRACT

There is provided a measurement device which is operable to measure a movable range of a finger easily in a further small size and a measurement method, and a program. The measurement device includes: a first linear motion mechanism which has a contacting part contacting a back of a hand and linearly moves along a longitudinal direction, the back of the hand serving as reference of measurement; a second linear motion mechanism which moves together with a finger targeted for the measurement and linearly moves along a longitudinal direction; and a rotation mechanism which rotatably connects one end of the first linear motion mechanism and one end of the second linear motion mechanism and has a sensor detecting a rotation amount of the second linear motion mechanism, the second linear motion mechanism rotating with respect to the first linear motion mechanism. Then, current values of the rotation amount detected by the sensor are obtained, and a measured value of a joint angle is calculated from a threshold value updated by (Continued)

a maximum value of the current values, the measured value showing a movable range of the finger. The present technology is applicable to, for example, a measurement device which measures a movable range of a finger.

10 Claims, 10 Drawing Sheets

(51) Int. Cl.
*G09B 15/06* (2006.01)
*G09B 15/00* (2006.01)

(56) References Cited

FOREIGN PATENT DOCUMENTS

| | | | | |
|---|---|---|---|---|
| JP | 2008-501376 | A | | 1/2008 |
| JP | 2018-508251 | A | | 3/2018 |
| JP | 2018029729 | A | * | 3/2018 |
| JP | 2019-066478 | A | | 4/2019 |
| KR | 20210118606 | A | * | 10/2021 |
| WO | WO-2016146817 | A1 | * | 9/2016 ........... A61B 5/1071 |
| WO | WO-2022265456 | A1 | * | 12/2022 |

* cited by examiner

MEASUREMENT DEVICE AND MEASUREMENT METHOD, AND PROGRAM FOR MEASURING A MOVEABLE RANGE OF A FINGER

CROSS REFERENCE TO PRIOR APPLICATION

This application is a National Stage Patent Application of PCT International Patent Application No. PCT/JP2020/046458 (filed on Dec. 14, 2020) under 35 U.S.C. § 371, which claims priority to Japanese Patent Application No. 2019-237875 (filed on Dec. 27, 2019), which are all hereby incorporated by reference in their entirety.

TECHNICAL FIELD

The present disclosure relates to a measurement device and a measurement method, and a program, and, in particular, relates to a measurement device which is operable to measure a movable range of a finger easily in a further small size and a measurement method, and a program.

BACKGROUND ART

In general, it is considered that the wider a movable range of a finger of a player who plays a musical instrument such as a piano, the more favorably the player can play. Therefore, it is assumed that by quantitatively measuring the movable range of the finger, a playing skill of the player to play the musical instrument can be enhanced.

Here, in Patent Document 1, a measurement device which can quantitatively measure a movable range of a finger, for example, in order for a patient performing rehabilitation to confirm effect of daily rehabilitation is disclosed.

CITATION LIST

Patent Document

Patent Document 1: Japanese Patent Application Laid-Open No. 2018-29729

SUMMARY OF THE INVENTION

Problems to be Solved by the Invention

In the meantime, conventionally, since the measurement device which measures the movable range of the finger for a purpose of the rehabilitation, as disclosed in Patent Document 1, has a large device configuration which leads to inconvenience in carrying around and is expensive, the measurement device is not suitable for use for a purpose of enhancing the playing skill as described above. Therefore, it is considered that when a measurement device which is further inexpensive, is small-sized, and is thereby convenient in carrying as and is available, individual players can easily measure a movable range of a finger of each of the players on a daily basis. Accordingly, measurement devices, each of which is small-sized and easily measures the movable range of the finger, have been demanded.

In view of the above-described circumstances, the present disclosure has been made and enables measurement of the movable range of the finger in a further small-sized and easy manner.

Solutions to Problems

According to one aspect of the present disclosure, a measurement device includes: a first linear motion mechanism that has a contacting part contacting a back of a hand and linearly moves along a longitudinal direction, the back of the hand serving as reference of measurement; a second linear motion mechanism that moves together with a finger targeted for the measurement and linearly moves along a longitudinal direction; and a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism.

According to one aspect of the present disclosure, a measurement method performed by a measurement device including a first linear motion mechanism that has a contacting part contacting a back of a hand and linearly moves along a longitudinal direction, the back of the hand serving as reference of measurement, a second linear motion mechanism that moves together with a finger targeted for the measurement and linearly moves along a longitudinal direction, and a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism, includes: device obtaining current values of the rotation amount being detected by the sensor; and calculating a measured value of a joint angle from a threshold value being updated by a maximum value of the current values, the measured value showing a movable range of the finger.

According to one aspect of the present disclosure, a program causes a computer of a measurement device including a first linear motion mechanism that has a contacting part contacting a back of a hand and linearly moves along a longitudinal direction, the back of the hand serving as reference of measurement, a second linear motion mechanism that moves together with a finger targeted for the measurement and linearly moves along a longitudinal direction, and a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism, to execute measurement processing including: obtaining current values of the rotation amount being detected by the sensor; and calculating a measured value of a joint angle from a threshold value being updated by a maximum value of the current values, the measured value showing a movable range of the finger.

In one aspect of the present disclosure, the measurement device is provided with the first linear motion mechanism that has the contacting part contacting the back of the hand and linearly moves along the longitudinal direction, the back of the hand serving as the reference of measurement; the second linear motion mechanism that moves together with the finger targeted for the measurement and linearly moves along the longitudinal direction; and the rotation mechanism that rotatably connects one end of the first linear motion mechanism and one end of the second linear motion mechanism and has the sensor detecting a rotation amount of the second linear motion mechanism, the second linear motion mechanism rotating with respect to the first linear motion mechanism, the current values of the rotation amount detected by the sensor are obtained, and the measured value of the joint angle is calculated from the threshold value updated by the maximum value of the current values, the measured value showing the movable range of the finger.

MODE FOR CARRYING OUT THE INVENTION

Hereinafter, with reference to the accompanying drawings, a specific embodiment to which the present technology is applied will be described in detail.

Configuration Example of Measurement Device

Figure 1:
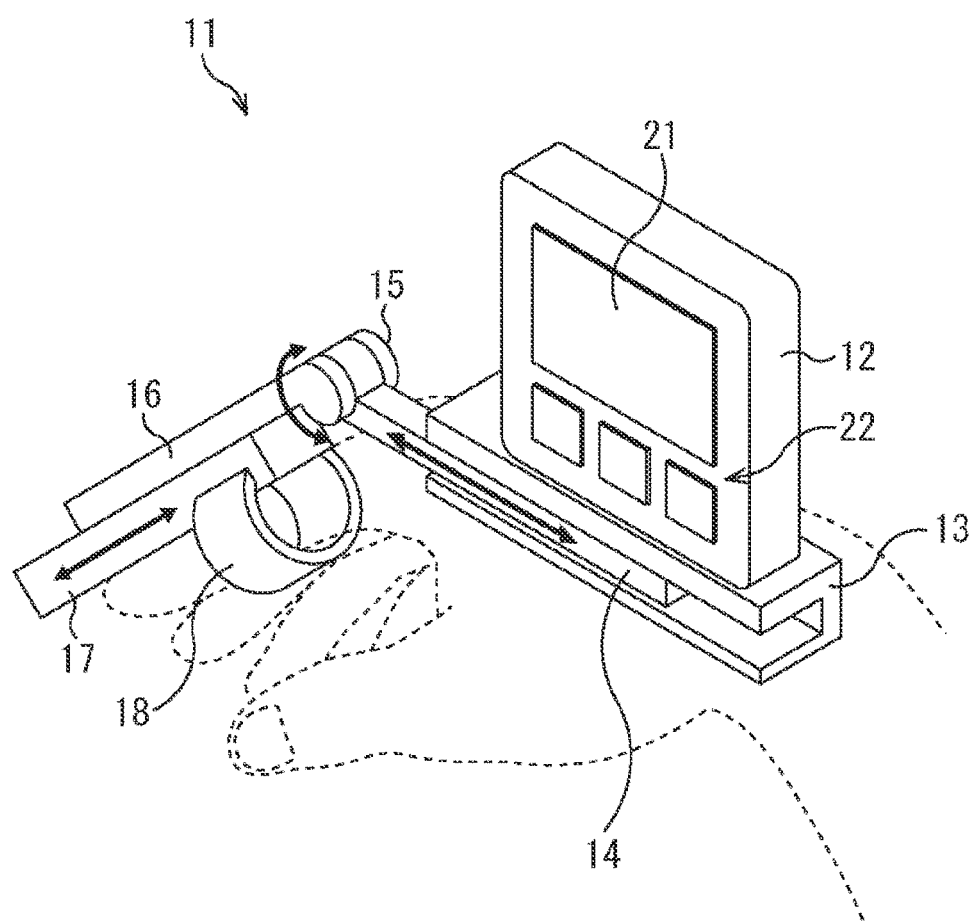
FIG. 1 is a perspective view showing a configuration example of one embodiment of a measurement device to which the present technology is applied.

FIG. 1 is a perspective view showing a configuration example of one embodiment of a measurement device to which the present technology is applied.

As shown in FIG. 1, the measurement device 11 includes a device housing 12, a guide part 13, a linear motion part 14, a rotation mechanism 15, a guide part 16, a linear motion part 17, and a retaining part 18. In addition, in FIG. 1, fingers of a measured person targeted for measurement of a movable range of a finger are shown by a broken line, and the measurement device 11 is attached to a finger of the measured person as shown in FIG. 1.

The device housing 12 has, for example, an information processing substrate to perform measurement processing for measuring the movable range of the finger incorporated thereinto and includes a display unit 21 and an operation part 22 which are provided on a surface of the device housing 12. In addition, the device housing 12 is attached to an upper surface of the guide part 13.

The guide part 13 and the linear motion part 14 constitute a linear motion mechanism which linearly moves relatively along mutual longitudinal directions. For example, a lower surface of the guide part 13 (a surface facing a side opposite to an upper surface on which the device housing 12 is attached) constitutes a contacting part which a back of a hand of the measured person contacts. Then, with the contacting part of the guide part 13 contacting the back of the hand of the measured person and the measurement device 11 placed, the movable range of the finger is measured. Accordingly, in accordance with movement of the finger made by the measured person, along a direction of a straight arrow shown in FIG. 1, the linear motion part 14 slides with respect to the guide part 13.

The rotation mechanism 15 has a rotation axis which rotatably connects one end of the linear motion part 14 and one end of the guide part 16 and a sensor which detects a rotation amount of rotation with the rotation axis as a center.

The guide part 16 and the linear motion part 17 constitute a linear motion mechanism which linearly moves relatively along mutual longitudinal directions. For example, the linear motion part 17 is fixed to the finger targeted for the measurement by the retaining part 18, thereby causing the linear motion mechanism constituted of the guide part 16 and the linear motion part 17 to move together with the finger targeted for the measurement. At this time, the one end of the guide part 16 is connected to the one end of the linear motion part 14 via the rotation mechanism 15 and in accordance with the movement of the finger made by the measured person, the linear motion part 17 thereby slides along the direction of the straight arrow shown in FIG. 1 with respect to the guide part 16.

The retaining part 18 is provided for the linear motion part 17, and the measured person fits the finger into the retaining part 18, thereby retaining the finger.

When movable ranges in which the finger targeted for the measurement extends and bends are measured, as shown in FIG. 1, the measurement device 11 configured as described above is attached such that a rotation axis of the rotation mechanism 15 is disposed substantially in parallel with a rotation axis of rotation of the finger in each of an extension direction and a bending direction.

Figure 2:
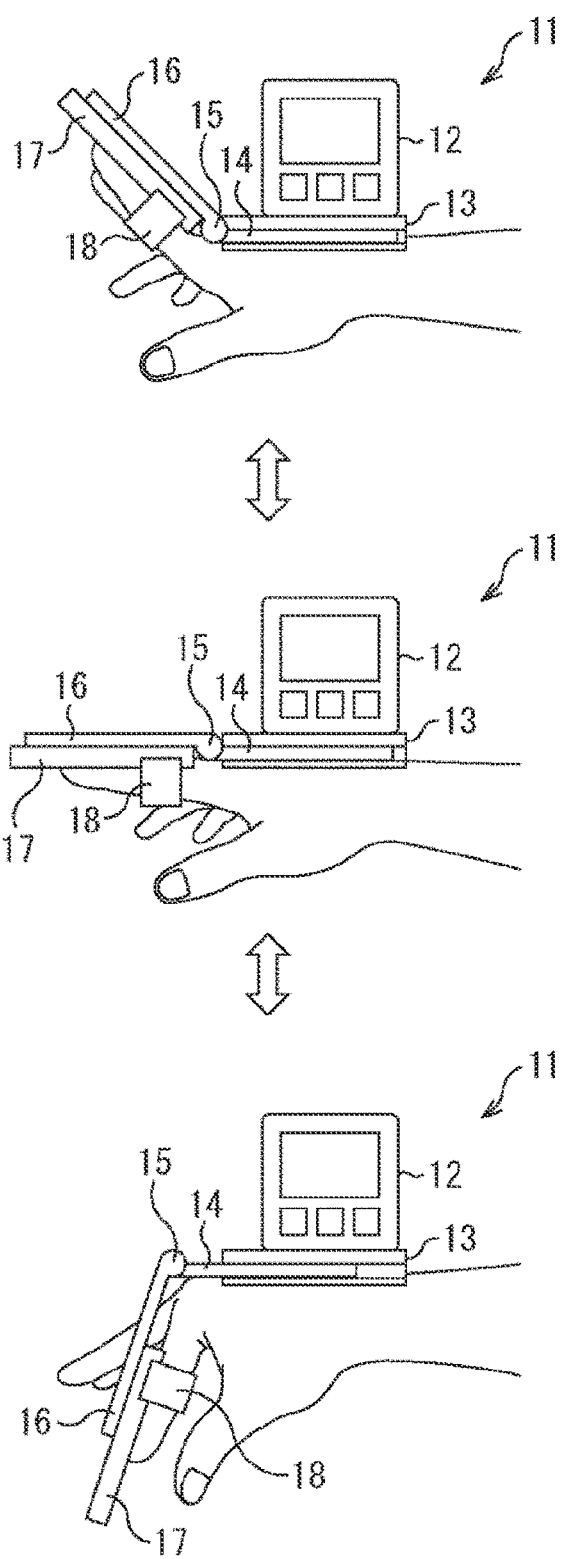
FIG. 2 is a diagram explaining a use example upon measuring movable ranges of extension and bending of a finger.

With reference to FIG. 2, a use example of the measurement device 11 in a case where the movable ranges of the finger in which the finger extends and bends will be described.

In a central portion of FIG. 2, a state in which a degree at a metacarpophalangeal (MP) joint of an index finger is defined as zero degrees is shown. Then, in an upper portion of FIG. 2, a state in which the MP joint of the index finger is moved in a direction in which the MP joint is extended is shown, and in a lower portion of FIG. 2, a state in which the MP joint of the index finger is moved in a direction in which the MP joint is bent is shown.

As shown in FIG. 2, in accordance with movement of the finger targeted for the measurement in which the finger extends or bends, the linear motion part 14 slides with respect to the guide part 13 and the linear mot iron part 17 slides with respect to the guide part 16. For example, with the guide part 13 contacting the back of the hand, the device housing 12 is held by a measurer or the measured person, thereby causing the linear motion part 14 to slide with respect to the guide part 13 which is fixed in a state parallel with the back of the hand. In addition, the finger is retained by the retaining part 18, thereby causing the linear motion part 17 fixed in a state parallel with the finger to slide with respect to the guide part 16.

Thus, by detecting the rotation amount with the rotation axis of the rotation mechanism 15 as the center, the measurement device 11 can measure the movable range of the finger targeted for the measurement in the extension direction or the bending direction (in an example in FIG. 2, a joint angle of the MP joint of the index finger).

In the meantime, in general, since a surface of the back of the hand is not flat and MP Mints of fingers are not linearly arranged, positional relationship of the MP joints of the fingers changes by deformation of the back of the hand. Therefore, in order to accurately measure the movable range of the finger by using the measurement device 11, it is required to define a surface serving as reference of the measurement for each of the fingers (the surface of the back of the hand in contact with a contacting surface of the guide part 13), and it is preferable that the measurement targeted for each of the fingers one by one is made.

Figure 3:
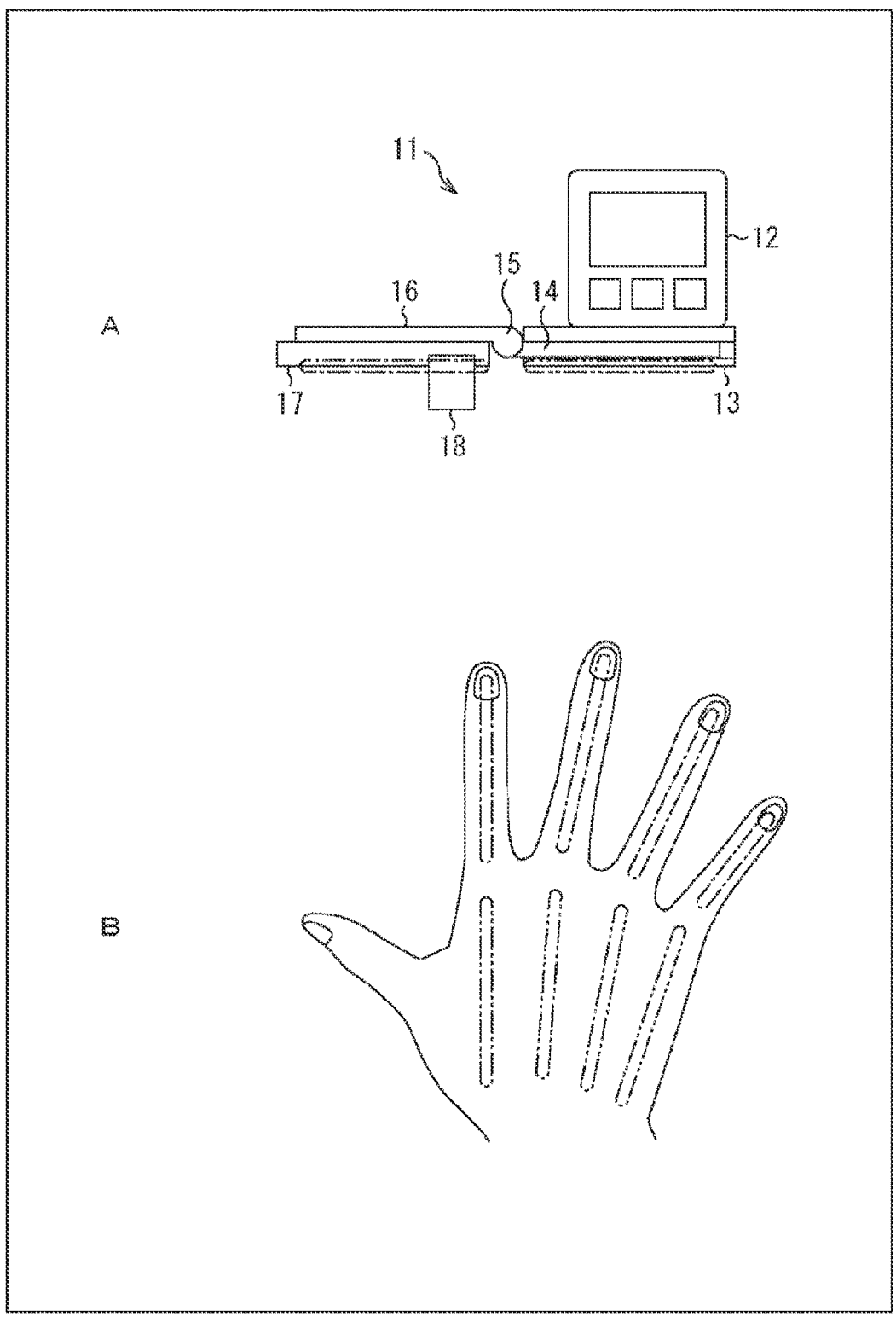
FIG. 3 shows diagrams explaining an attachment method of the measurement device to the finger.

With reference to FIG. 3, an attachment method of the measurement device 11 to the finger will be described.

For example, in A of FIG. 3, when the linear motion part 17 is fixed to the finger by the retaining part 18, a contacting surface of the linear motion part 17, which contacts the finger, is shown in such a way as to be enclosed by a one-dot chain line, and a contacting surface of the guide part 13, which contacts the back of the hand at that time, is shown in such a way as to be enclosed by a two-dot chain line.

Then, in B of FIG. 3, contacting portions of the contacting surface of the linear motion part 17 are shown in such a way as to be enclosed by a one-dot chain line, and contacting portions of the contacting surface of the guide part 13 are shown in such a way as to be enclosed by a two-dot chain line. For example, in a case where the index finger is targeted for the measurement, a proximal phalanx of the index finger is held by the retaining part 18, the contacting surface of the linear motion part 17 contacts the back of the index finger in such a way as to come along the back thereof, and the contacting surface of the guide part 13 contacts a metacarpal of the index finger of the back of the hand in such a way as to come along the metacarpal thereof. Similarly, in a case where a middle finger is targeted for the measurement, a proximal phalanx of the middle finger is held by the retaining part 18, the contacting surface of the linear motion part 17 contacts the back of the middle finger in such a way as to come along the back thereof, and the contacting surface of the guide part 13 contacts a metacarpal of the middle finger of the back of the hand in such a way as to come along the metacarpal thereof. In addition, measurement targeted for a third finger and a little finger is similarly made.

As described above, the measurement device 11 is attached such that the linear motion mechanism constituted of the guide part 16 and the linear motion part 17 contacts the back of the finger targeted for the measurement and the linear motion mechanism constituted of the guide part 13 and the linear motion part 14 contacts the metacarpal of the finger, targeted for the measurement, of the back of the hand in such a way as to come along the metacarpal thereof. The measurement device 11 is attached by employing the above-described attachment method, in anatomy, the movable range (in an example in FIG. 3, a joint angle of the MP joint) can be accurately measured.

In addition, besides the movable range of the MP joint, the measurement device 11 can measure a movable range of a proximal interphalangeal (PIP) joint or a distal interphalangeal (DIP) joint. For example, in a case where a movable range of the PIP joint is measured, a middle phalanx of the finger targeted for the measurement is retained by the retaining part 18 and the contacting surface of the guide part 13 contacts the proximal phalanx and the middle phalanx in such a way as to come along the proximal phalanx and the middle phalanx. In addition, in a case where a movable range of the DIP joint is measured, a distal phalanx of the finger targeted for the measurement is retained by the retaining part 18 and the contacting surface of the guide part 13 contacts the middle phalanx, the proximal phalanx, and the middle phalanx in such a way as to come along the middle phalanx, the proximal phalanx, and the middle phalanx.

Functional Configuration Example of Measurement Device

Figure 4:
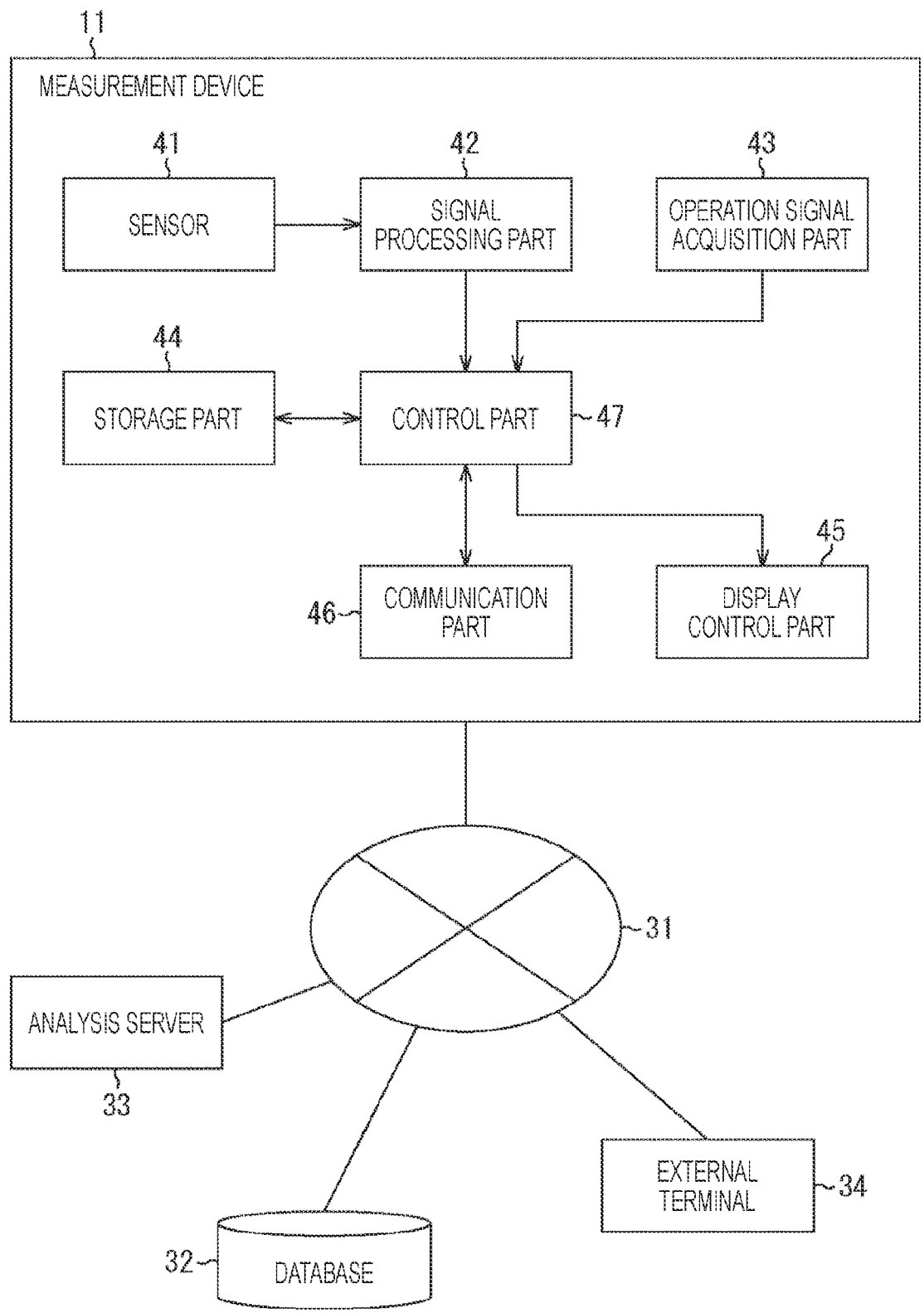
FIG. 4 is a block diagram showing a functional configuration example of the measurement device.

FIG. 4 is a block diagram showing a functional configuration example of the measurement device 11.

As shown in FIG. 4, the measurement device 11 can be connected via a network 31 to a database 32, an analysis server 33, and an external terminal 34. In addition, the measurement device 11 includes a sensor 41, a signal processing part 42, an operation signal acquisition part 43, a storage part 44, a display control part 45, a communication part 46, and a control part 47.

The sensor 41 constituted of, for example, a potentiometer, an encoder, or the like and detects a rotation amount of the linear motion mechanism constituted of the guide part 16 and the linear motion part 17, the linear motion mechanism constituted of the guide part 16 and the linear motion part 17 rotating with respect to the linear motion mechanism constituted of the guide part 13 and the linear motion part 14 in FIG. 1. Then, the sensor 41 supplies a sensor signal showing the rotation amount to the signal processing part 12.

As signal processing on the sensor signal supplied from the sensor 41, the signal processing part 42 performs, for example, noise reduction processing for reducing noise of the sensor signal, conversion processing for converting a voltage of the sensor signal into an angle (or a position), and the like. Then, the signal processing part 42 supplies a sensor value obtained as a result of subjecting the sensor signal to the signal processing to the control part 47.

The operation signal acquisition part 43 acquires an operation signal in accordance with an operation made to the operation part 22 (FIG. 1) constituted of, for example, kinds of buttons and the like and supplies the operation signal to the control part 47.

The storage part 44 is, for example, a non-volatile memory built in the device housing 12, a card type memory which can be attached to and detached from the device housing 12, or the like and stores measured values obtained as a result of the measurement by the measurement device 11. Note that in a case where these measured values are stored in the database 32, the configuration of the measurement device 11 may be a configuration in which the storage part 44 is not provided.

In accordance with control by the control part 47, the display control part 45 performs control to display kinds of display screens (see the later-described FIG. 6) on the display unit 21 in FIG. 1.

The communication part 46 performs communication via the network 31 and transmits, for example, the measured values obtained as the result of the measurement by the measurement device 11. Note that the communication part 46 can perform wired communication or wireless communication and in addition thereto, can directly transmit the measured values to the external terminal 34 by infrared communication, short-distance wireless communication, or the like. Furthermore, the measurement device 11 may have a configuration in which a two-dimensional code showing the measured values is displayed on the display unit 21 and the two-dimensional code is read by the external terminal 34.

Figure 5:
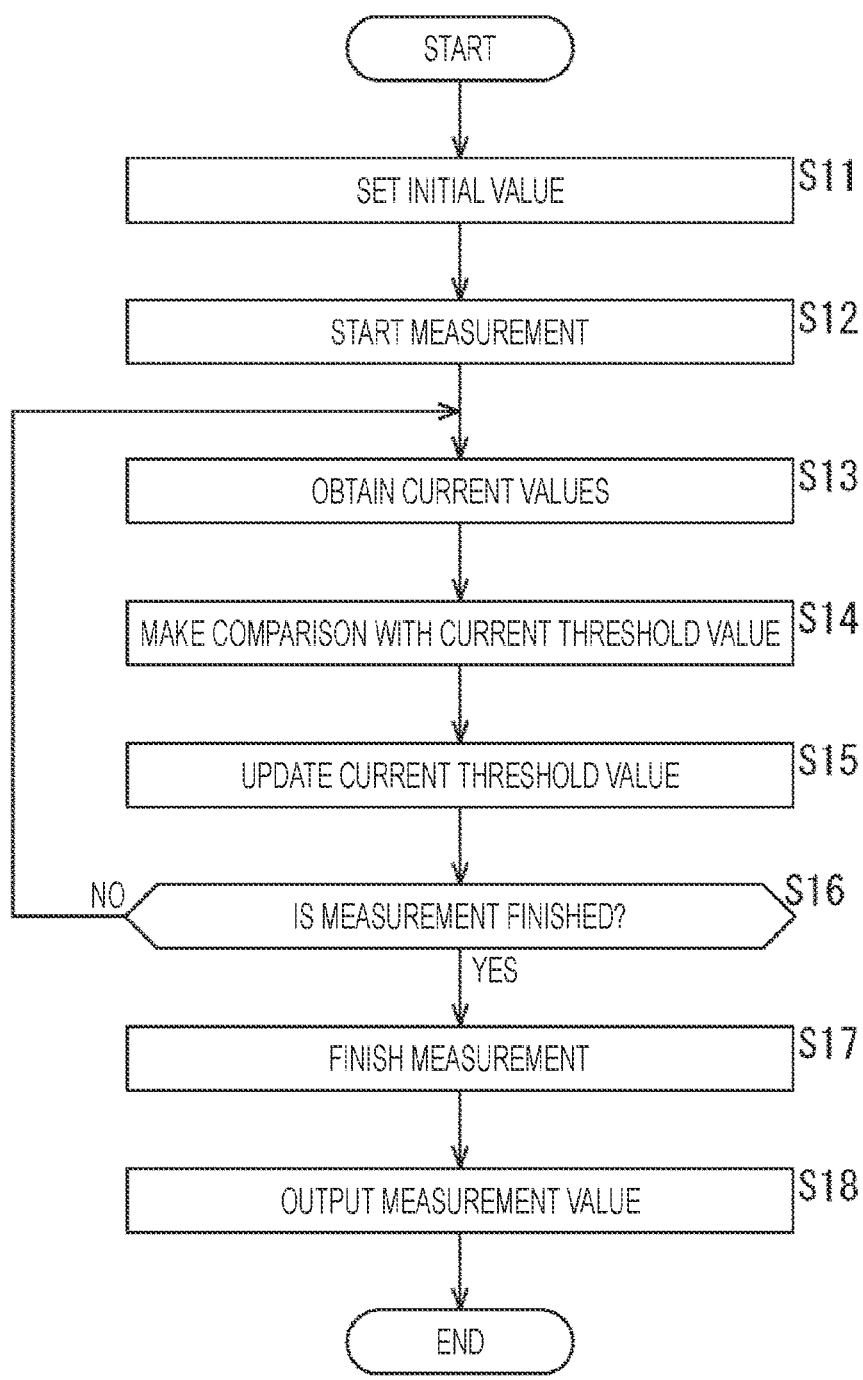
FIG. 5 is a flowchart explaining measurement processing.

The control part 47 performs control to blocks constituting the measurement device 11 and executes measurement processing described with reference to FIG. 5. For example, the control part 47 obtains current values of the rotation amount detected by the sensor 41 and can calculate the measured value of the joint angle, which shows the movable range of the finger, from a threshold value (hereinafter, referred to as a current threshold value) which is updated by a maximum value of the current values.

Then, the control part 47 can perform control to the communication part 46 so as to transmit the measured values obtained as the result of the measurement by the measurement device 11, via the network 31, to the database 32, the analysis server 33, and the external terminal 34. As described above, by directly transmitting the measured values from the measurement device 11, seamless measurement and evaluation can be made, for example, without intervention of a personal computer.

For example, the measured values measured by the measurement device 11 can be confirmed by the external terminal 34 such as a smartphone and a tablet. In addition, by analyzing history data of the measured values recorded in the database 32 by the analysis server 33, for example, recommendation and the like of training to widen the movable ranges of the finger can be made.

In addition, the measurement device 11 can store the history data of the measured values in the storage part 44 and display the history data thereof on the display unit 21, thereby allowing the measured person to confirm the history data thereof. In addition, by directly transmitting the history data of the measured values to the external terminal 34 by the communication part 46, the measurement device 11 analyzes the history data on the external terminal 34, for example, the recommendation and the like of the training to widen the movable ranges of the fingers can be made.

Processing Example of Measurement Processing

With reference to a flowchart shown in FIG. 5, one example of measurement processing performed on the measurement device 11 will be described.

For example, in a state in which the finger targeted for the measurement is retained by the retaining part 18 and with the contacting part of the guide part 13 contacting the back of the hand of the measured person and the measurement device 11 placed, as shown in the central portion of FIG. 2, when the finger targeted for the measurement is kept still with the MP joint of the finger targeted for the measurement as zero degrees, the measurement processing is started.

Then, in step S11, the control part 47 sets the sensor value supplied from the signal processing part 42 at a start time of the measurement processing as an initial value and thereafter, in step S12, the measurement is started.

In step S13, the control party 47 obtains sensor values sequentially supplied from the signal processing part 42 as current values.

In step S14, the control part 47 compares the current values obtained in step S13 and the current threshold value. Here, the current threshold value is the largest value among the sensor values obtained while measurement processing at one time is performed.

In step S15, in accordance with a result of the comparison in step S14, in a case where the current value is larger than the current threshold value, the control part 47 updates the current threshold value by the current value. Note that in a case where the current value is the current threshold value or less in the result of the comparison in step S14, the current threshold value is not updated and processing in step S15 is skipped.

In step S16, the control part 47 determines whether or not the measurement is finished. For example, when an elapsed time from when the measurement processing is started has reached measurement finish time which is previously set, the control part 47 determines that the measurement is finished.

In step S16, in a case where the control part 47 determines that the measurement is not finished, the processing returns to step S13 and thereafter, the similar processing is repeatedly performed.

On the other hand, in step S16, in a case where the control part 47 determines that the measurement is finished, the processing proceeds to step S17 and the measurement is finished.

In step S18, the control part 47 outputs, as the measured value, the current threshold value at the time of finishing the measurement, that is, the largest value among the sensor values obtained while measurement processing this time is performed. For example, the control part 47 causes the display unit 21 to display the measured value via the display control part 45 and causes the external terminal 34 to transmit the measured value via the communication part 46.

After the processing in step S18, the measurement processing is finished.

As described above, in the measurement processing performed in the measurement device 11, the measured person can measure the movable range of the finger only by freely moving the finger. In other words, without operating the operation part 22, the measurement device 11 automatically measures the movable range of the finger which the measured person moves up to limits, and the largest value among the sensor values obtained during the measurement processing is obtained as the measured value of the joint angle, which shows the movable range of the finger. Thus, the measurement device 11 can further easily measure the movable range of the finger.

Of course, the measurement device 11 may start or finish the measurement processing by operating the operation part 22.

Display Example of Measurement Result

Figure 6:
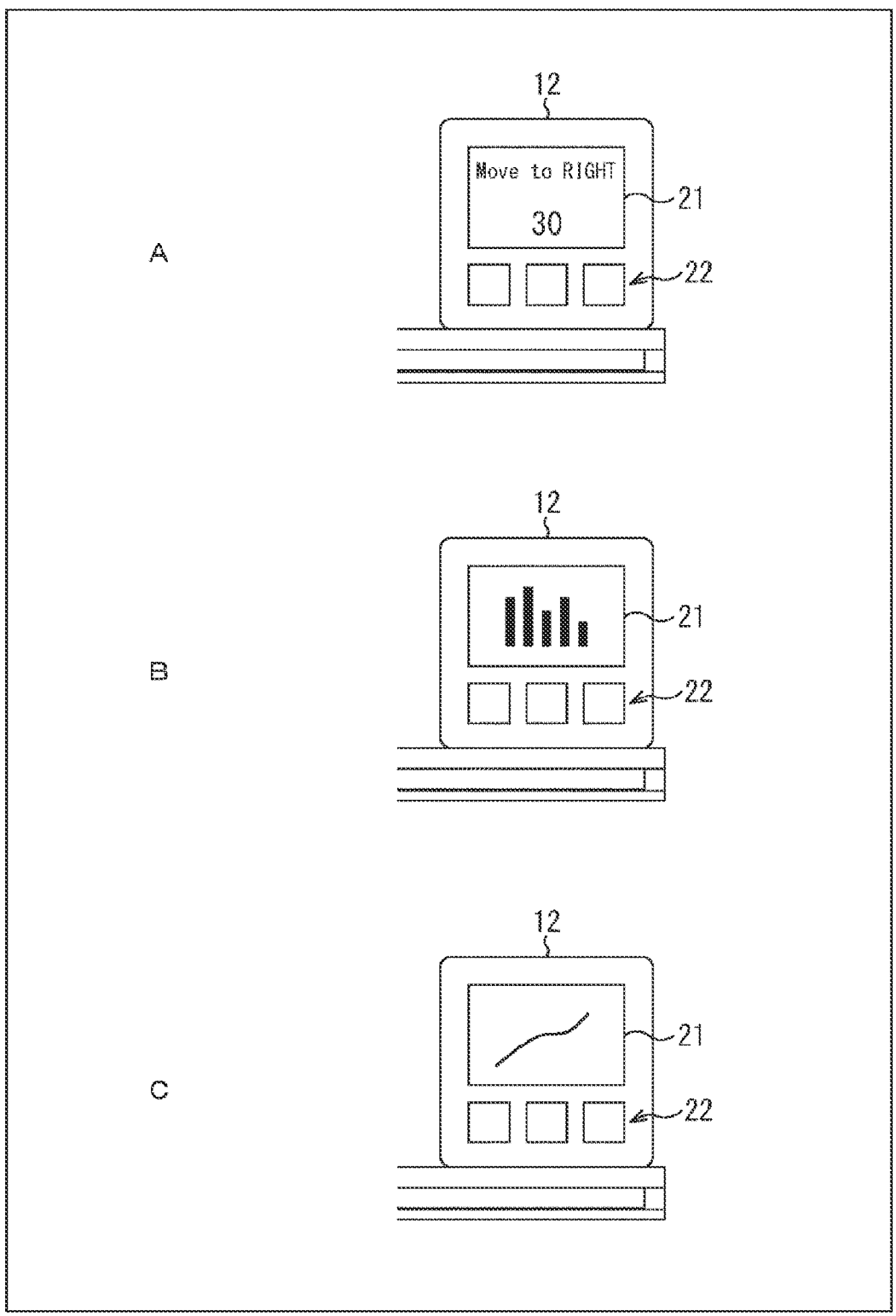
FIG. 6 shows diagrams explaining a display screen displayed in a display unit of the measurement device.
Figure 7:
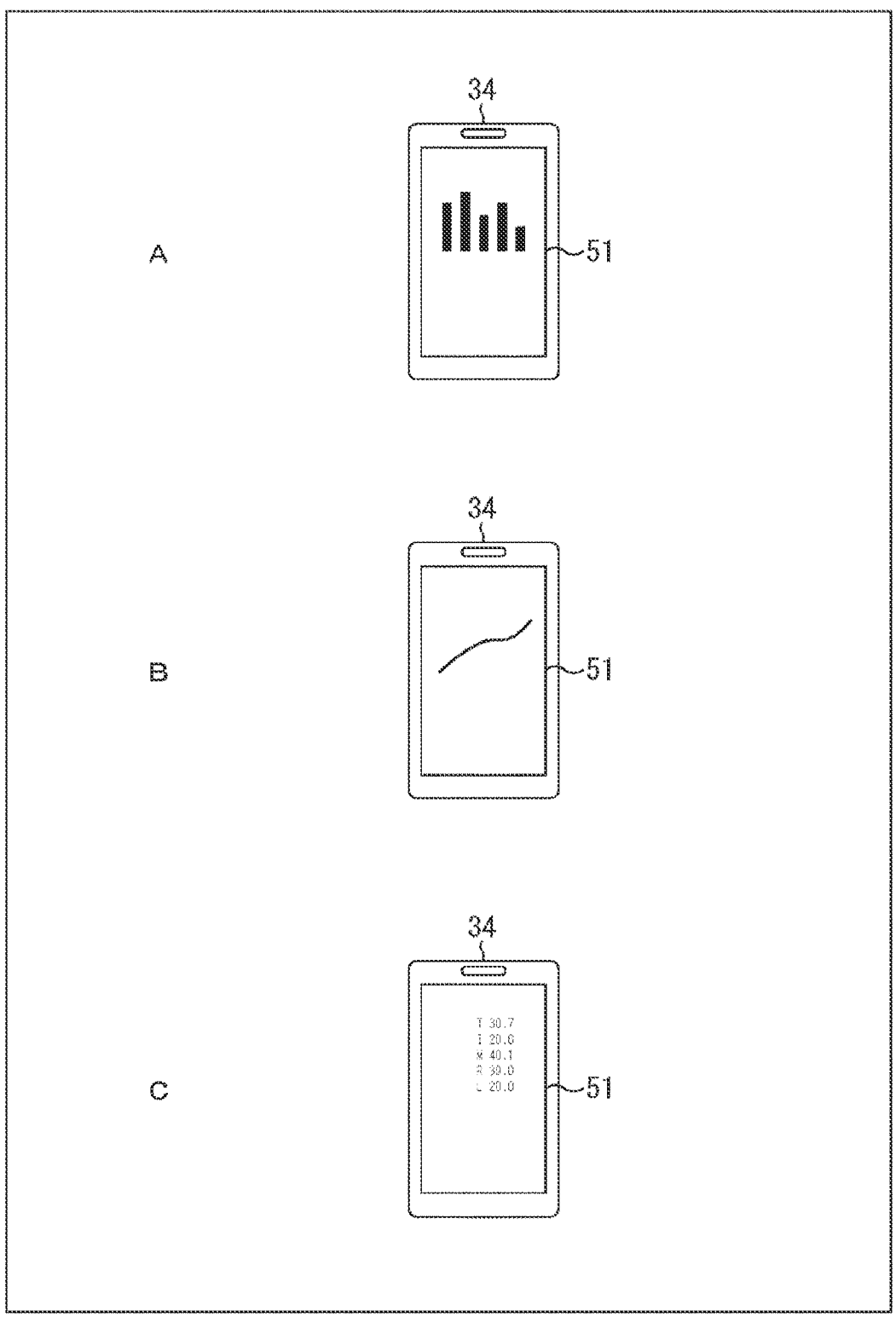
FIG. 7 shows diagrams explaining a display screen displayed in a display of an external terminal.

With reference to FIG. 6 and FIG. 7, a display example of a measurement result obtained in the measurement processing by the measurement device 11 will be described.

Shown in A of FIG. 6 is the display example of a display screen displayed on the display unit 21 during the measurement processing by the measurement device 11.

During the measurement processing by the measurement device 11, on the display unit 21, a display screen in which a numerical value showing a current score (30 shown in A of FIG. 6), a message showing an instruction of a direction in which the finger targeted for the measurement is moved (Move to RIGHT shown in A of FIG. 6), and the like are displayed is displayed. For example, as the current score, a value based on the current threshold value used in the description of the flowchart in FIG. 5 can be used. In addition, the instruction to move the finger toward the abduction direction or the adduction direction or the extension direction or the bending direction can be issued by the message. Note that together with the instruction of the direction in which the finger is moved, specific sound (for example, beep sound or the like) may be outputted.

Shown in B of FIG. 6 is a first display example of the display screen displayed on the display unit 21 after the measurement processing by the measurement device 11.

For example, in a case where movable ranges of five fingers are measured by using the measurement device 11, on the display unit 21, a display screen in which the movable ranges of the fingers are shown by a bar graph is displayed. The movable ranges of the five fingers can be easily compared by the above-mentioned display screen.

Shown in C of FIG. 6 is a second display example of the display screen displayed on the display unit 21 after the measurement processing by the measurement device 11.

For example, in a case where a movable range of a certain finger is measured by using the measurement device 11, on the display unit 21, a display screen in which history data of measured values of the movable range of the finger is displayed by a line graph showing time-series change is displayed. Time-series change in the movable range of a specific finger can be easily comprehended. Note that line graphs of the five fingers may be displayed in a superimposed manner.

In addition, shown in A of FIG. 7, as with B of FIG. 6, is a display example in which a display screen displaying movable ranges of fingers by a bar graph is displayed on a display 51 of the external terminal 34. In addition, shown in B of FIG. 7, as with C of FIG. 6, is a display example in which a display screen displaying history data of measured values of movable ranges of fingers by a line graph showing time-series change is displayed on the display 51 of the external terminal 34.

In addition, shown in C of FIG. 7 is a display example in which in a case where the movable ranges of the five fingers are measured by using the measurement device 11, a display screen displaying numerical values of the movable ranges of the fingers is displayed on the display 51 of the external terminal 34.

As described above, the measurement device 11 stores the history data of the measured values in the storage part 44 and presents the time-series change of the movable ranges of the fingers, thereby allowing the measured person to confirm growth and improvement so as to widen the movable ranges.

In addition, the measurement device 11 presents the general numerical values of the movable ranges of the fingers and the measured values of the movable ranges of the fingers of the measured person, thereby allowing strong and weak points as to evaluation items to be conveyed to the measured person. Alternatively, the measurement device 11 can perform ranking display among measured persons who have shared data via the network 31. Furthermore, as to history data of measured values of a multitude of measured persons, the measurement device 11 performs statistical calculation by the analysis server 33, thereby allowing recommendation of practice as to items, for which effect to further improve among some evaluation items is anticipated, to be made.

Use Example of Measurement Device

Figure 8:
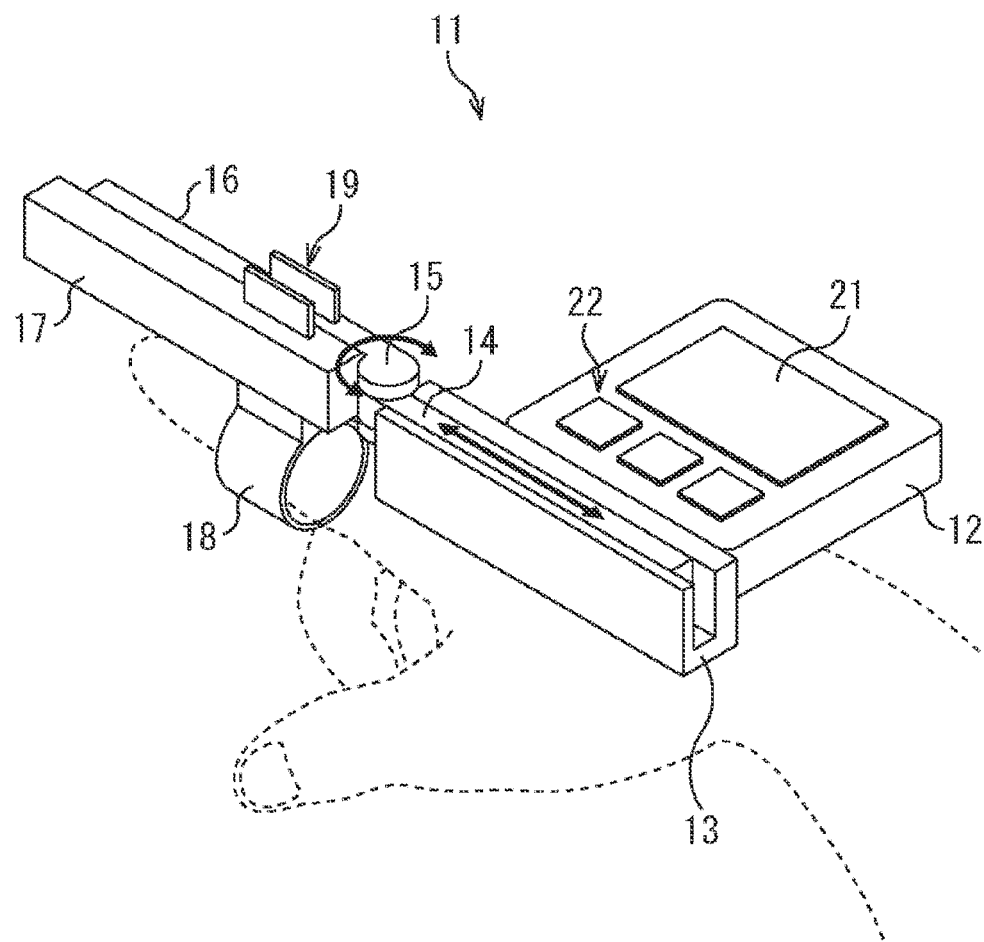
FIG. 8 is a diagram showing a use example upon measuring movable ranges of abduction and adduction of the finger.
Figure 9:
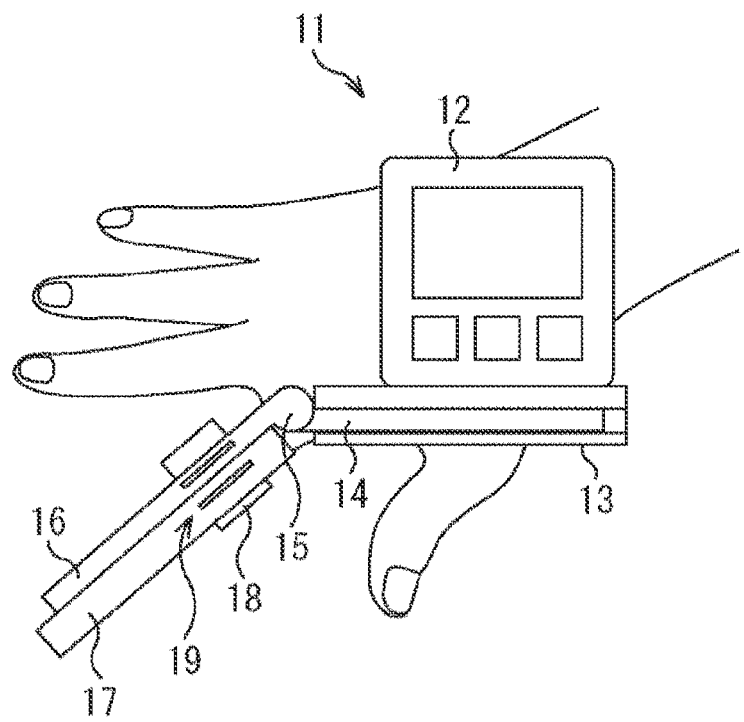
FIG. 9 shows diagrams explaining measurement of the movable ranges of the abduction and the adduction of the finger.
Figure 9:
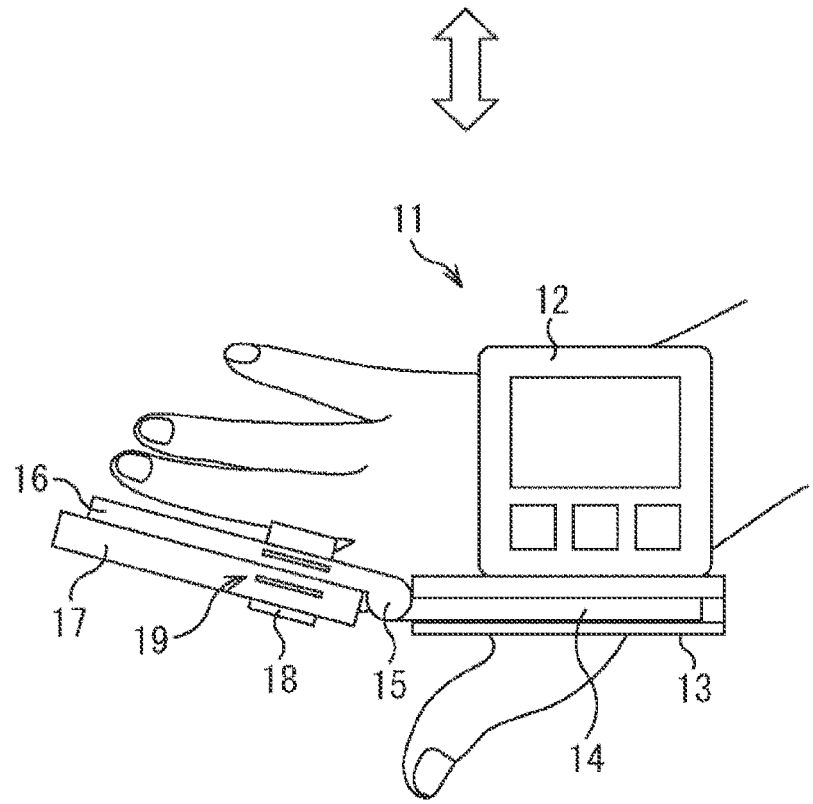

With reference to FIG. 8 and FIG. 9, a use example in which the movable ranges of the abduction and the adduction of the finger are measured by using the measurement device 11 will be described.

For example, a rotation axis of the finger made when the finger rotates in each of an abduction direction and an adduction direction is orthogonal to a rotation axis of the finger made when the finger rotates in each of an extension direction and a bending direction at 90 degrees. Accordingly, when movable ranges in which the finger is abducted and adducted are measured, the measurement device 11 is attached to the finger of the measured person in a state in which the measurement device 11 is rotated at 90 degrees with respect to a direction in which the measurement device 11 is attached when the movable ranges in which the finger extends and bends are measured.

In other words, as shown in FIG. 8, the measurement device 11 is attached to the finger of the measured person such that a surface on which the display unit 21 and the operation part 22 of the device housing 12 are provided faces upward with respect to the back of the hand and the guide part 13 contacts the back of the hand. Accordingly, a direction in which the retaining part 18 is provided for the guide part 16 and the linear motion part 17 is also a direction which is rotated at 90 degrees with respect to a direction in which the movable ranges are measured when the finger extends and bends. For example, retaining parts 18 which are different from each other between when the movable ranges in which the finger extends and bends are measured and when the movable ranges in which the finger is abducted and adducted are measured may be provided according to directions of the measurement, or a rotation mechanism which rotates retaining parts 18 which are the same as each other according to the directions of the measurement may be provided.

Thus, when the movable ranges in which the finger targeted for the measurement is abducted and adducted are measured, the measurement device 11 is attached such that the rotation axis of the rotation mechanism 15 substantially matches a rotation axis of rotation of the finger in the abduction direction and the adduction direction.

In addition, in a case where the rotation axis of the rotation of the finger in the abduction direction and the adduction direction matches the rotation axis of the rotation mechanism 15, a distance from a center of the rotation up to the retaining part 18 is substantially constant. Therefore, in this case, the necessity for sliding the linear motion part 17 with respect to the guide part 16 is low, and fixing the guide part 16 and the linear motion part 17 by a fixing member 19 allows further accurate measurement to be performed.

With reference to FIG. 9, a use example of the measurement device 11 upon measuring the movable ranges of the abduction and the adduction of the finger will be described.

On an upper side of FIG. 9, a state in which a MP joint of an index finger is moved in the abduction direction is shown, and on a lower side of FIG. 9, a state in which the MP joint of the index finger is moved in the adduction direction is shown. As shown therein, in a case where the movable ranges of the abduction and the adduction of the finger are measured, the rotation axis of the rotation of the finger in each of the abduction direction and the adduction direction can substantially match the rotation axis of the rotation mechanism 15.

As described above, in a state in which the measured person places the device housing 12 on the back of the hand and fixes a palm of the hand on a flat surface of a desk or the like, the measured person moves the finger targeted for the measurement to the maximum in right and left directions, thereby allowing the measured person to measure the movable ranges of the abduction and the adduction of the finger.

Note that as described above, although the measurement device 11 includes the single axis rotation mechanism 15, the measurement device 11 can include, for example, a dual-axis rotation mechanism which rotates on two axes. For example, the measurement device 11 including the dual-axis rotation mechanism can measure the movable ranges in the extension direction and the bending direction and the movable ranges in the abduction direction and the adduction direction without reattachment.

In addition, in a case where the measurement is performed with one part of the back of the hand and a back of the proximal phalanx as reference, instead of the sensor which detects the rotation amount of the rotation mechanism 15, in the measurement device 11, inertial measurement unit (IMU) sensors, each of which detects acceleration and an angular velocity of each of the guide part 13 and the guide part 16 can be used. For example, each of the IMU sensors is a nine-axis sensor which can measure terrestrial magnetism, besides the acceleration and the angular velocity. Then, the measurement device 11 calculates relative angles by the IMU sensor on a side of the guide part 13 and the IMU sensor on a side of the guide part 16, thereby allowing the movable ranges of the finger to be measured.

As described above, the measurement device 11 to which the present technology is applied is compact and can be manufactured at further low costs, for example, as compared with the measurement device disclosed in the above-described Patent Document 1. Accordingly, the measurement device 11 is convenient in carrying around and enables easy measurement of the movable ranges of the finger. Thus, players who play musical instruments such as pianos can quantitatively measure the movable ranges of the finger in their home on a daily basis, hence allowing playing skills to be enhanced.

Configuration Example of Computer

Next, the above-described series of processes (information processing method) can be performed by hardware and can be performed by software. In a case where the series of processes is performed by the software, a program constituting the software is installed in a general-purpose computer or the like.

Figure 10:
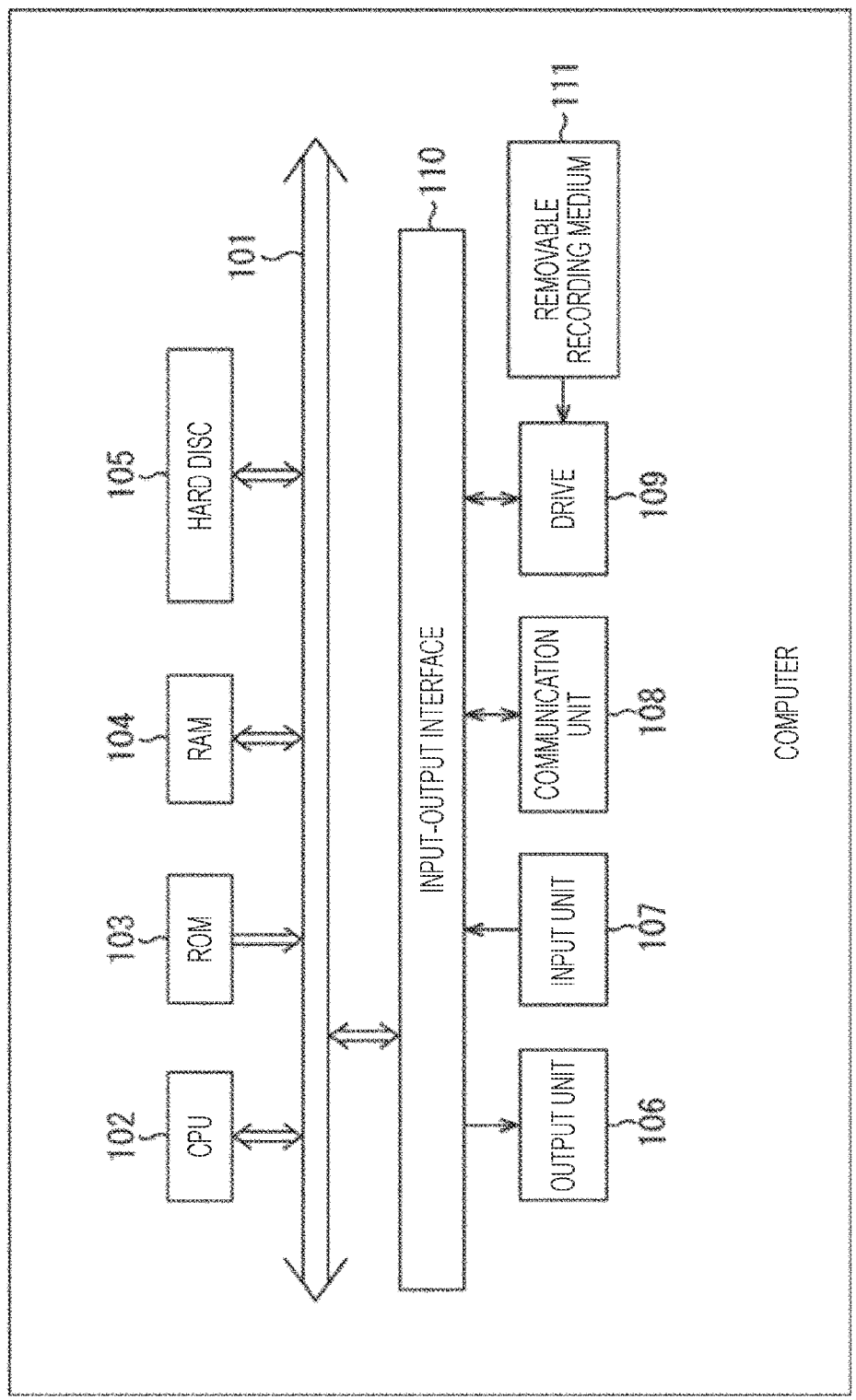
FIG. 10 is a block diagram showing a configuration example of one embodiment of a computer to which the present technology is applied.

FIG. 10 is a block diagram showing a configuration example of one embodiment of the computer in which the program executing the above-described series of processes is installed.

The program can be previously recorded in a hard disc 105 or a ROM 103 as a recording medium built in the computer.

Alternatively, the program can be stored (recorded) in a removable recording medium 111 which is driven by a drive 109. Such a removable recording medium 111 can be provided as the so-called package software. Here, as the removable recording medium 111, there are, for example, a flexible disc, a compact disc read only memory (CD-ROM), a magneto optical (MO) disc, a digital versatile disc (DVD), a magnetic disc, a semiconductor memory, and the like.

Note that the program is installed in the computer from the removable recording medium 111 as described above and in addition thereto, the program can be downloaded into the computer via a communication network or a broadcasting network and can be installed in the built-in hard disc 105. In other words, the program can be transferred, for example, from a download site, to the computer in a wireless manner via an artificial satellite for digital satellite broadcasting or to the computer in a wired manner via a network such as a local area network (LAN) and the Internet.

The computer has a central processing unit (CPU) 102 built therein, and an input-output interface 110 is connected via a bus 101 to the CPU 102.

When a command is inputted via the input-output interface 110 by an operation of an input unit 107 made by a user or the like, in response thereto, the CPU 102 executes the program stored in the read only memory (ROM) 103. Alternatively, the CPU 102 loads the program stored in the hard disc 105 to a random access memory (RAM) 104 and executes the program.

Thus, the CPU 102 performs processing in accordance with the above-described flowcharts or processing performed by the configuration of the above-described block diagram. Then, the CPU 102 outputs a processing result as needed, for example, via the input-output interface 110 from an output unit 106 or, for example, transmits the processing result from a communication unit 108 and further, records the processing result in the hard disc 105, and does others.

Note that the input unit 107 is constituted of a keyboard, a mouse, a microphone, and the like. In addition, the output unit 106 is constituted of a liquid crystal display (LCD), a loudspeaker, and the like.

Here, in the present description, it is not necessarily required to perform the processing, which the computer performs in accordance with the program, in chronological order along the order described in the flowcharts. In other words, the processing, which the computer performs accordance with the program, also includes processing executed parallelly or individually (for example, parallel processing or processing by an object).

In addition, the program may be a program processed by one computer (processor) or may be a program processed by a plurality, of computers in a distributed manner. Furthermore, the program may be a program which is transferred to a remote computer to be executed.

Furthermore, in the present description, a system means aggregate of a plurality of constituent elements (an apparatus, a module (component), and the like), and it does not matter whether or not all the constituent elements are in the same one housing. Accordingly, either of a plurality of apparatuses which is housed in separate housings and is connected via a network or one apparatus in which a plurality of modules is housed in one housing as a system.

In addition, for example, a configuration described as one apparatus (or one processing unit) may be divided and the configuration may be configured as a plurality of apparatuses (or processing units). Conversely, a configuration described as a plurality of apparatuses (or processing units) may be configured as one apparatus (or one processing unit). In addition, of course, a configuration other than the above-described configuration may be added to the configuration of the apparatuses (or the processing units). Furthermore, as long as the configuration and operation of the whole system is substantively the same, a part of a configuration of a certain apparatus (or a certain processing unit) may be included in other apparatus (or other processing unit).

In addition, for example, the present technology can adopt a configuration of cloud computing in which one function is shared by a plurality of apparatuses via a network and is processed in a cooperative manner.

In addition, for example, the above-described program can be executed on any apparatus. In this case, it is only required for that apparatus to have necessary functions (functional blocks or the like) and to be operable to acquire necessary information.

In addition, for example, the steps described with reference to the above-described flowcharts are executed by one apparatus and in addition thereto, the steps can be executed by a plurality of apparatuses in a shared manner. Furthermore, in a case where a plurality of processes is included in one step, the plurality of processes can be executed by one apparatus or in addition thereto, the plurality of processes can be executed by a plurality of apparatuses in a shared manner. In other words, a plurality of processes included in one step an also be executed as processes of a plurality of steps. Conversely, the processes described as the plurality of steps can be collectively executed as one step.

Note that as to the program executed by the computer, the processes of the steps which describe the program may be executed in a time-series manner along the order described in the present description or may be individually executed in a parallel manner or at necessary timing such as timing at which calling-out is made. In other words, as long as no inconsistency is caused, the processes of the steps may be executed in order different from the above-described order.

Furthermore, the processes of the step describing this program may be executed in parallel with processes of other program or may be executed in combination with processes of other program.

Note that each of the plurality of kinds of the present technology described in the present description can be singly implemented in an independent manner as long as no inconsistency is caused. Of course, the plurality of kinds of the present technology described therein can also be implemented in combination with any plurality of kinds of the present technology. For example, one part or all of the present technology described in any of the embodiments can also be implemented in combination with one part or all of the present technology described in the embodiment other than any of the embodiments. In addition, one part or all of the above-described any of the present technology can also be implemented in combination with other technology which is not described above.

Combination Example of Configurations

Note that the present technology can adopt configurations described blow.

(1)
A measurement device including:
a first linear motion mechanism that has a contacting part contacting a back of a hand and linearly moves along a longitudinal direction, the back of the hand serving as reference of measurement;
a second linear motion mechanism that moves together with a finger targeted for the measurement and linearly moves along a longitudinal direction; and
a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism.

(2)
The measurement device according to the above-described (1), in which
performed is measurement processing in which current values of the rotation amount being detected by the sensor are obtained and a measured value of a joint angle is calculated from a threshold value being updated by a maximum value of the current values, the measured value showing a movable range of the finger.

(3)
The measurement device according to the above-described (2), in which
the first linear motion mechanism has a first guide part for which the contacting part is provided and a linear motion part that slides with respect to the first guide part, and
on a surface other than a surface serving as the contacting part of the first guide part, a housing into which an information processing substrate calculating the measured value is incorporated is provided.

(4)
The measurement device according to the above-described (3), in which
the second linear motion mechanism has a second guide part whose one end is connected to the rotation mechanism and a second linear motion part that slides with respect to the second guide part, and
a retaining part that retains the finger targeted for the measurement is provided for the second linear motion part.

(5)
The measurement device according to the above-described (4), in which
upon measuring a movable range of the finger,
with a longitudinal direction of the second linear motion mechanism along the finger targeted for the measurement, the finger is retained by the retaining part, and
with a longitudinal direction of the first linear motion mechanism along a metacarpal of the finger targeted for the measurement, the contacting part contacts a back of a hand.

(6)
The measurement device according to any one of the above-described (1) to (5), in which
a rotation axis of the rotation mechanism is disposed substantially in parallel with a rotation axis of rotation in which the finger targeted for the measurement rotates in each of an extension direction and a bending direction, and movable ranges in which the finger extends and bends are measured.

(7)
The measurement device according to any one of the above-described (1) to (5), in which
a rotation axis of the rotation mechanism is disposed such that the rotation axis of the rotation mechanism substantially matches a rotation axis of rotation in which the finger targeted for the measurement rotates in each of an adduction direction and an abduction direction, and movable ranges in which the finger is adducted and is abducted are measured.

(8)
The measurement device according to any one of the above-described (2) to (5), further including
a communication part that transmits the measured value.

(9)
A measurement method performed by a measurement device including
a first linear motion mechanism that has a contacting part contacting a back of a hand and linearly moves along a longitudinal direction, the back of the hand serving as reference of measurement,
a second linear motion mechanism that moves together with a finger targeted for the measurement and linearly moves along a longitudinal direction, and
a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism,
the measurement method including:
obtaining current values of the rotation amount being detected by the sensor; and
calculating a measured value of a joint angle from a threshold value being updated by a maximum value of the current values, the measured value showing a movable range of the finger.

(10)

A program that causes a computer of a measurement device including
- a first linear motion mechanism that has a contacting part contacting a back of a hand and linearly moves along a longitudinal direction, the back of the hand serving as reference of measurement,
- a second linear motion mechanism that moves together with a finger targeted for the measurement and linearly moves along a longitudinal direction, and
- a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism, to execute measurement processing including:
- obtaining current values of the rotation amount being detected by the sensor; and
- calculating a measured value of a joint angle from a threshold value being updated by a maximum value of the current values, the measured value showing a movable range of the finger.

Note that the embodiment of the present technology is not limited to the above-described embodiment and various modifications can be made without departing from the scope of the present technology. In addition, effects described in the present description are merely illustrative and not restrictive and there may be other effects.

REFERENCE SIGNS LIST

11 Measurement device
12 Device housing
13 Guide part
14 Linear motion part
15 Rotation mechanism
16 Guide part
17 Linear motion part
18 Retaining part
19 Fixing member
21 Display unit
22 Operation part
31 Network
32 Database
33 Analysis server
34 External terminal
41 Sensor
42 Signal processing part
43 Operation signal acquisition part
44 Storage part
45 Display control part
46 Communication part
47 Control part
51 Display

The invention claimed is:

1. A measurement device comprising:
   a first linear motion mechanism that has a contacting part contacting a back of a hand and linearly moves along a longitudinal direction, the back of the hand serving as reference of measurement;
   a second linear motion mechanism that moves together with a finger targeted for the measurement and linearly moves along a longitudinal direction; and
   a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism.

2. The measurement device according to claim 1, wherein performed is measurement processing in which current values of the rotation amount being detected by the sensor are obtained and a measured value of a joint angle is calculated from a threshold value being updated by a maximum value of the current values, the measured value showing a movable range of the finger.

3. The measurement device according to claim 2, wherein the first linear motion mechanism has a first guide part for which the contacting part is provided and a linear motion part that slides with respect to the first guide part, and
on a surface other than a surface serving as the contacting part of the first guide part, a housing into which an information processing substrate calculating the measured value is incorporated is provided.

4. The measurement device according to claim 3, wherein the second linear motion mechanism has a second guide part whose one end is connected to the rotation mechanism and a second linear motion part that slides with respect to the second guide part, and
a retaining part that retains the finger targeted for the measurement is provided for the second linear motion part.

5. The measurement device according to claim 4, wherein upon measuring a movable range of the finger,
with a longitudinal direction of the second linear motion mechanism along the finger targeted for the measurement, the finger is retained by the retaining part, and
with a longitudinal direction of the first linear motion mechanism along a metacarpal of the finger targeted for the measurement, the contacting part contacts a back of a hand.

6. The measurement device according to claim 1, wherein a rotation axis of the rotation mechanism is disposed in parallel with a rotation axis of rotation in which the finger targeted for the measurement rotates in each of an extension direction and a bending direction, and movable ranges in which the finger extends and bends are measured.

7. The measurement device according to claim 1, wherein a rotation axis of the rotation mechanism is disposed such that the rotation axis of the rotation mechanism matches a rotation axis of rotation in which the finger targeted for the measurement rotates in each of an adduction direction and an abduction direction, and movable ranges in which the finger is adducted and is abducted are measured.

8. The measurement device according to claim 2, further comprising
a communication part that transmits the measured value.

9. A measurement method performed by a measurement device including
a first linear motion mechanism that has a contacting part contacting a back of a hand and linearly moves along a longitudinal direction, the back of the hand serving as reference of measurement,
a second linear motion mechanism that moves together with a finger targeted for the measurement and linearly moves along a longitudinal direction, and
a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism, the measurement method comprising:
- obtaining current values of the rotation amount being detected by the sensor; and
- calculating a measured value of a joint angle from a threshold value being updated by a maximum value of the current values, the measured value showing a movable range of the finger.

10. A program that causes a computer of a measurement device including
- a first linear motion mechanism that has a contacting part contacting a back of a hand and linearly moves along a longitudinal direction, the back of the hand serving as reference of measurement,
- a second linear motion mechanism that moves together with a finger targeted for the measurement and linearly moves along a longitudinal direction, and
- a rotation mechanism that rotatably connects one end of the first linear motion mechanism and one end of the second linear motion mechanism and has a sensor detecting a rotation amount of the second linear motion mechanism, the second linear motion mechanism rotating with respect to the first linear motion mechanism, to execute measurement processing comprising:
- obtaining current values of the rotation amount being detected by the sensor; and
- calculating a measured value of a joint angle from a threshold value being updated by a maximum value of the current values, the measured value showing a movable range of the finger.

\* \* \* \* \*